Reissued June 4, 1940

Re. 21,476

UNITED STATES PATENT OFFICE 21,476

AZO DYES

Swanie S. Rossander, Wilmington, Del., assignor to E. I. du Pont de Nemours & Company, Wilmington, Del., a corporation of Delaware No Drawing. Original No. 2,148,134, dated February 21, 1939, Serial No. 122,011, January 23, 1937. Application for reissue November 28, 1939, Serial No. 306,488

8 Claims. (Cl. 260—159)

A. This invention relates to azo dyestuffs and to material of organic fibrous origin dyed with the new dyestuffs, and to processes of producing the dyes and of dyeing. The invention will be described with reference to particular examples but this description is to be taken as exemplary, not limitative.

B. It is an object of the invention to dye cotton and regenerated cellulose particularly, and also wool, leather, and organic derivatives of cellulose, such as the cellulose esters and ethers, by processes which yield on cotton and regenerated cellulose dyeings of outstanding fastness to washing. Other objects of the invention will be to produce the new dyes and dyed products by processes which are economically and technically satisfactory.

C. The objects of the invention are accomplished, generally speaking, by diazotizing the compounds produced in our copending application Serial Number 122,030, filed of even date herewith, and coupling thereto azo dyestuff developing agents such as beta naphthol, pyrazolone, 2:4-dihydroxy quinoline, meta tolylene diamine, and aceto acetanilide. The objects of the invention are accomplished in a preferred form by dyeing the material with the products of the said identified application, subjecting the dyed fiber to a diazotization process and coupling it to the selected developing agent. Preferred results are sometimes obtained by the use of beta naphthol and 1-phenyl-3-methyl-5-pyrazolone. It will be found that dyestuffs possessing ortho amino azo groups on the N components are not generally diazotizable and are, consequently, not satisfactory for use in this invention.

D. The invention will be more fully comprehended by reference to the examples, in the table of which the arrows indicate that the preceding compound is diazotized and coupled to the indicated equivalents of the compounds to which the arrows point. The symbol PAB means para-amino-benzoyl and the symbol MAB means meta-amino-benzoyl.

*Example I*

Five parts of cotton piece goods were dyed in the usual manner known to those in the art with ten-hundredths part of (1-meta-amino-phenyl-3-methyl-5-pyrazolone)$_2$⇇Di (para-amino-benzoyl) 1:3-diamino benzene-4-sulfonic acid. The dyed fabric (yellow in color) was rinsed in cold water and put in a casserole with 200 parts of water at 20° C. Three-tenths part of sodium nitrite and four-tenths part of sulfuric acid were added. The whole was stirred 15 minutes and rinsed with cold water. One-tenth part of 1-phenyl-3-methyl-5-pyrazolone was dissolved in 200 cc. water and one-tenth part of soda ash. The solution was stirred rapidly while adding the above rinsed piece goods and then stirred slowly for 15 minutes and rinsed in cold water and dried. The dyeing was a bright greenish yellow in shade. The formula of the dye on the fiber is:

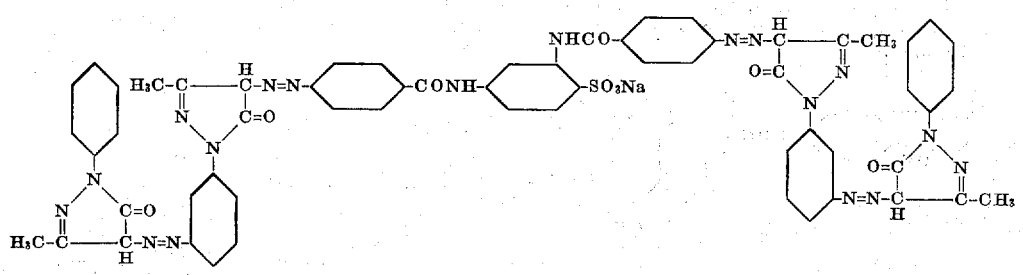

*Example II*

Five parts of cotton piece goods were dyed in the usual manner known to those skilled in the art with two hundredths part of di(para amino benzoyl) meta phenylene diamine⇉(J-acid)$_2$. The dyed fabric (red in color) was rinsed in cold water and put in a casserole with 200 parts of water at 20° C. Three tenths part of sodium nitrite and four tenths part of sulfuric acid were added. The whole was stirred 15 minutes and rinsed with cold water. One tenth part of 2-naphthol was dissolved in 200 parts of water and one twentieth part of caustic soda. The solution was stirred rapidly while adding the above rinsed piece goods. The mass was stirred for 15 minutes, rinsed in cold water and dried. The dyeing was a bright Bordeaux shade. The formula of the dye on the fiber is:

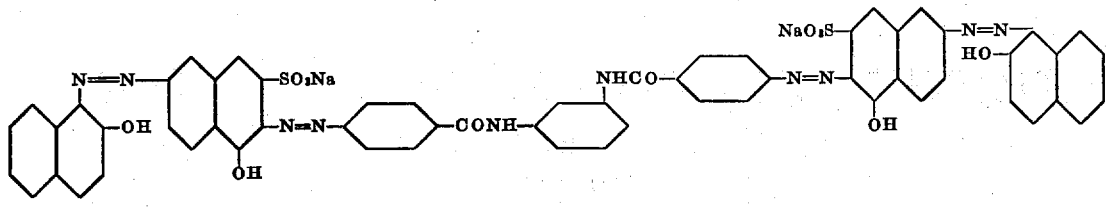

*Example III*

Five parts of cotton piece goods were dyed in the usual manner known to those skilled in the art with two hundredths part of di(meta amino benzoyl) 1 - 3 - diamino - benzene - 4 - sulfonic acid⇄(meta amino benzoyl J-acid)$_2$. The dyed fabric (orange in color) was rinsed in cold water and put in a casserole with 200 parts of water at 20° C. Three tenths part of sodium nitrite and four tenths part of sulfuric acid were added. The whole was stirred 15 minutes and rinsed with cold water. One tenth part of 2-naphthol was dissolved in 200 parts of water and one twentieth part of caustic soda. The solution was stirred rapidly while adding the above rinsed piece goods. The mass was stirred for 15 minutes, rinsed in cold water and dried. The dyeing was a bright orange shade. The formula of the dye on the fiber is:

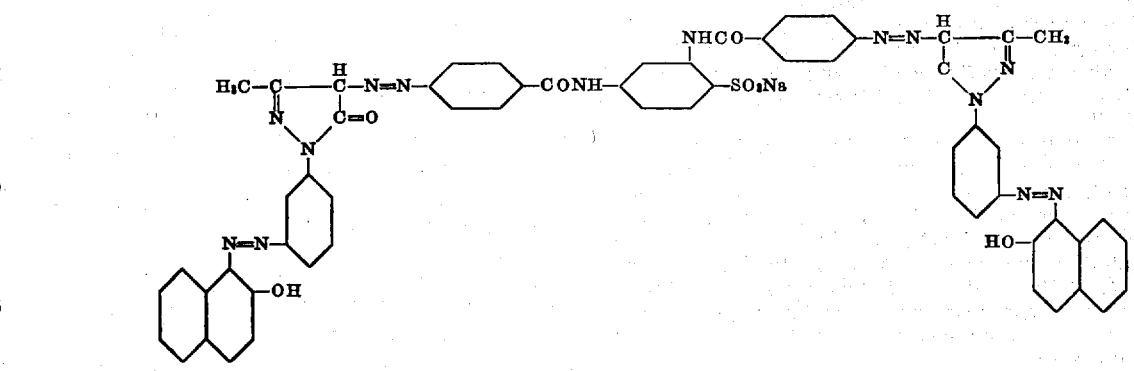

*Example IV*

Five parts of cotton piece goods were dyed in the usual manner known to those skilled in the art with two hundredths part of di(para amino benzoyl) 1-3-diamino benzene-4-sulfonic acid⇄(1-meta amino phenyl-3-methyl-5-pyrazolone)$_2$. The dyed fabric (yellow in color) was rinsed in cold water and put in a casserole with 200 parts of water at 20° C. Three tenths part of sodium nitrite and four tenths part of sulfuric acid were added. The whole was stirred 15 minutes and rinsed with cold water. One tenth part of 2-naphthol was dissolved in 200 parts of water and one-twentieth part of caustic soda. The solution was stirred rapidly while adding the above rinsed piece goods. The mass was stirred for 15 minutes, rinsed in cold water and dried. The dyeing was a bright yellow orange shade. The formula of the dye on the fiber is:

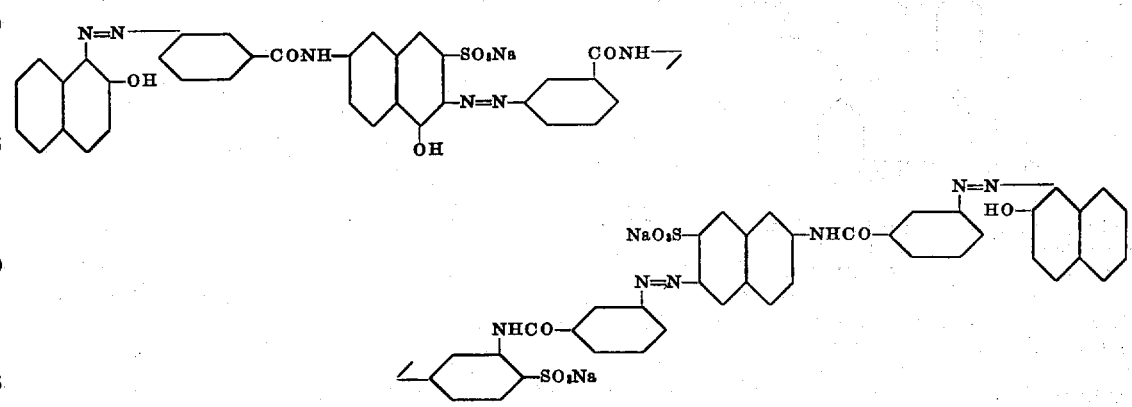

*Example V*

8 parts of (1-meta-amino-phenyl-3-methyl-5-pyrazolone)$_2$⇄di(para - amino - benzoyl) 1:3 - diamino benzene-4-sulfonic acid were slurried with 300 parts of water. 2 parts of caustic soda were added and warmed to solution and then cooled to 20° C. 2 parts of sodium nitrite were added and the whole was dumped in 5 parts of hydrochloric acid (100%) and stirred for 3 hours, maintaining acidity to Congo red and a distinct excess of sodium nitrite.

5 parts of beta naphthol were slurried with 200 parts of water. Approximately 1.4 parts of caustic soda were added and warmed to solution, distinctly alkaline to brilliant yellow paper. The whole was cooled to 20° C. 10 parts of soda ash were added and stirred until dissolved. The tetrazo prepared in the above paragraph was slowly added and the mass stirred three hours, maintaining a distinct excess of beta naphthol and alkalinity on brilliant yellow paper. The whole was warmed to 75° C., filtered, and dried at 90°–100° C. The dried powder was yellow. The formula of the dye is:

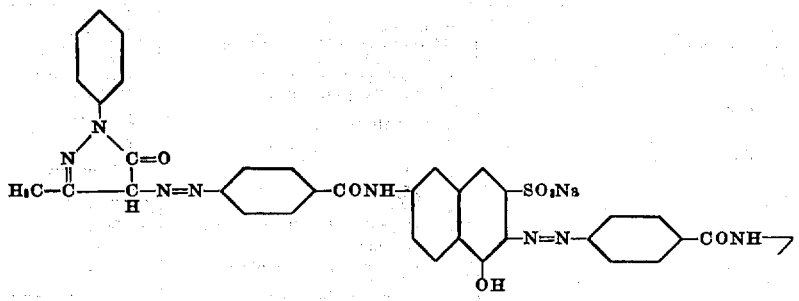

*Example VI*

11 parts of (para-amino-benzoyl J-acid)$_2$⇇di(para-amino-benzoyl) 1:3-diamino benzene-4-sulfonic acid were slurred with 300 parts of water. 2 parts of caustic soda were added and warmed until dissolved. The whole was cooled to 20° C. and 2 parts of sodium nitrite were added. The mass was dumped in 5 parts of hydrochloric acid (100%) and stirred for 3 hours, maintaining an acidity to Congo red and distinct excess of sodium nitrite.

5 parts of 1-phenyl-3-methyl-5-pyrazolone soda were slurried and stirred at 20° C. until dissolved. 10 parts of soda ash were added and stirred until dissolved. The tetrazo prepared in the above paragraph was slowly added. The mass was stirred 3 hours, keeping an excess of 1-phenyl-3-methyl-5-pyrazolone and red alkalinity on brilliant yellow paper. The mass was warmed to 70° C., filtered, and dried at 90-100° C. The formula of the dye is:

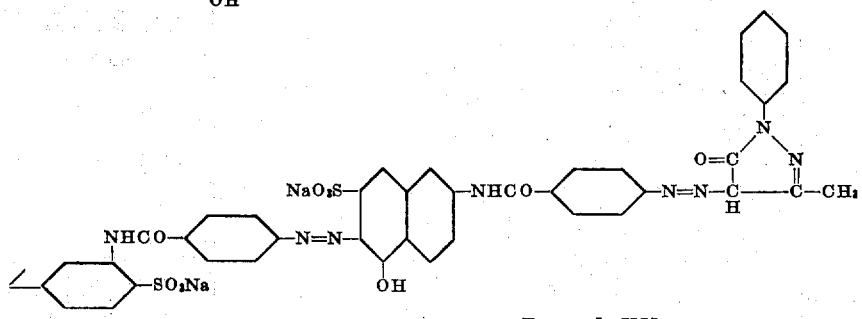

*Example VII*

Five parts of cotton piece goods were dyed in the usual manner known to those in the art with four-hundredths part of (para-amino-benzoyl J-acid)$_2$⇇di (para-amino-benzoyl) 1:3-diamino benzene-4-sulfonic acid. The dyed fabric (orange in shade) was rinsed in cold water and put in a casserole with 200 parts of water at 20° C. Three-tenths part of sodium nitrite and four-tenths part of sulfuric acid were added. The whole was stirred 15 minutes and rinsed with cold water. One tenth part of 2-naphthol was dissolved in 200 parts water and one twentieth part of caustic soda. The solution was stirred rapidly while adding the above rinsed piece goods. The mass was stirred for 15 minutes, rinsed in cold water and dried. The dyeing was a bright orange shade. The formula of the dye is:

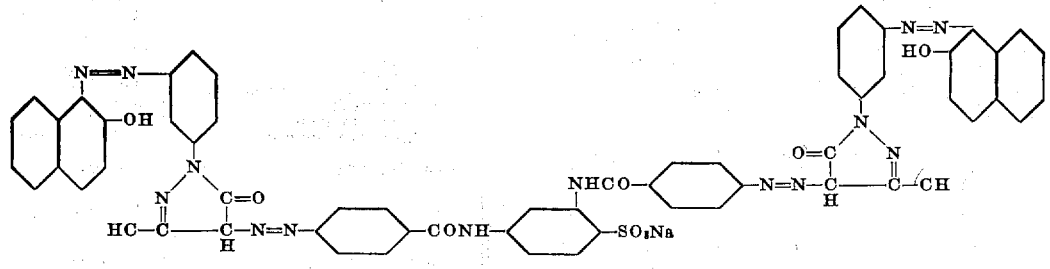

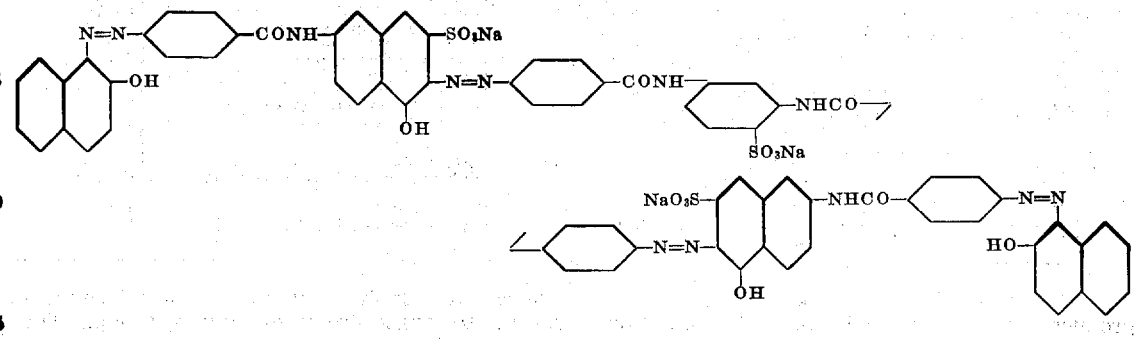

In the following tables precedures similar to the foregoing were employed.

| | Diazo component | Coupling component | Shade on cotton |
|---|---|---|---|
| 8 | Di(para-amino-benzoyl) 1:3-diamino benzene → ((para-amino-benzoyl) J-acid)$_2$ | Beta naphthol | Orange. |
| | | 1-phenyl-2-methyl-5-pyrazolone | Scarlet. |
| | | Aceto acetanilide | Do. |
| | | Meta tolylene diamine | Dull scarlet. |
| | | 2:4-dihydroxy quinoline | Orange. |
| 9 | Di(para-amino-benzoyl) 1:3-diamino benzene → ((meta-amino-benzoyl) J-acid)$_2$ | Beta naphthol | Do. |
| 10 | Di(para-amino-benzoyl) 1:3-diamino benzene → (J-acid)$_2$ | do | Bordeaux. |
| 11 | Di(para-amino-benzoyl) 1:3-diamino benzene → (1-meta-amino-phenyl-5-pyrazolone-3-carboxylic acid)$_2$ | do | Orange. |
| | | 1-phenul-3-methyl-5-pyrazolone | Yellow. |
| 12 | Di(para-amino-benzoyl) 1:3-diamino benzene → ((para-amino-benzoyl) J-acid) (1-meta-amino-phenyl-5-pyrazolone-3-carboxylic acid) | Beta naphthol | Orange. |
| | | 1-phenyl-3-methyl-5-pyrazolone | Yellow. |
| | | 2-4 dihydroxy quinoline | Do. |
| | | Meta phenylene diamine | Yellow brown. |
| | | Aceto acetanilide | Yellow. |
| 13 | Di(para-amino-benzoyl) 1:3-diamino benzene → (Di(para-amino-benzoyl) 3:5-diamino benzoyl J-acid)$_2$ | Beta naphthol | Orange. |
| 14 | Di(para-amino-benzoyl) 1:4-diamino benzene → J-acid | do | Bordeaux. |
| 15 | Di(para-amino-benzoyl) 1:4-diamino naphthalene → ((meta-amino-benzoyl) J-acid)$_2$ | do | Orange. |
| 16 | Di(para-amino-benzoyl) 1:4-diamino naphthalene → ((para-amino-benzoyl) J-acid)$_2$ | do | Do. |
| 17 | Di(para-amino-benzoyl) 1:4-diamino naphthalene → (1-meta-amino-phenyl-5-pyrazolone-3-carboxylic acid)$_2$ | Beta naphthol | Do. |
| | | 1-phenyl-3-methyl-5-pyrazolone | Yellow. |
| 18 | Di(para-amino-benzoyl) 1:3-diamino benzene-4-sulfonic acid → (1-meta-amino-phenyl-5-pyrazolone-3-carboxylic acid)$_2$ | Beta naphthol | Orange. |
| | | 2:4-dihydroxy quinoline | Yellow. |
| | | Aceto acetanilide | Do. |
| | | 1-phenyl-3-methyl-5-pyrazolone | Do. |
| | | Meta-tolylene diamine | Yellow brown. |
| 19 | Di(para-amino-benzoyl) 1:3-diamino benzene-4-sulfonic acid → ((meta-amino-benzoyl) J-acid)$_2$ | Beta naphthol | Orange. |
| 20 | Di(para-amino-benzoyl) 1:3-diamino benzene-4-sulfonic acid → ((para-amino-benzoyl) J-acid)$_2$ | do | Do. |
| 21 | Di(para-amino-benzoyl) 1:3-diamino benzene-4-sulfonic acid → (1-meta-amino-phenyl-3-methyl-5-pyrazolone)$_2$ | Beta naphthol | Orange. |
| | | 1-phenyl-3-methyl-5-pyrazolone | Yellow. |
| | | Aceto acetanilide | Do. |
| | | 2:4-dihydroxy quinoline | Do. |
| | | Meta phenylene diamine | Yellow brown. |
| 22 | Di(para-amino-benzoyl) 1:3-diamino benzene-4-sulfonic acid → (1-meta-amino-phenyl-5-pyrazolone-3-carboxylic acid) ((para-amino-benzoyl) J-acid) | Beta naphthol | Orange. |
| 23 | Di(para-amino-benzoyl) 1:3-diamino benzene-4-sulfonic acid → (meta toluidine)$_2$ | do | Do. |
| 24 | Di(para-amino-benzoyl) 1:3-diamino benzene-4-sulfonic acid → (Di(para-amino-benzoyl) 3:5-diamino benzoyl J-acid)$_2$ | do | Do. |
| 25 | Di(para-amino-benzoyl) 1:3-diamino benzene-4-sulfonic acid → (Di(para-amino-benzoyl) 3:5-diamino benzoyl J-acid)$_2$ | 1-phenyl-3-methyl-5-pyrazolone | Yellow orange. |
| 26 | Di(para-amino-benzoyl) 1:4-diamino benzene-5-sulfonic acid → ((para-amino-benzoyl) J-acid)$_2$ | Beta naphthol | Orange. |
| 27 | Di(para-amino-benzoyl) 1:4-diamino benzene-5-sulfonic acid → ((meta-amino-benzoyl) J-acid)$_2$ | do | Do. |
| 28 | Di(para-amino-benzoyl) 1:4-damino benzene-5-sulfonic acid → (1-meta-amino-phenyl-5-pyrazolone-3-carboxylic acid)$_2$ | Beta naphthol | Do. |
| | | 1-phenyl-3-methyl-5-pyrazolone | Yellow. |
| 29 | Di(para-amino-benzoyl) 1:4-diamino benzene-5-sulfonic acid → (1-meta-amino-phenyl-3-methyl-5-pyrazolone)$_2$ | Beta naphthol | Orange. |
| | | 1-phenyl-3-methyl-5-pyrazolone | Yellow. |
| 30 | Di(para-amino-benzoyl) 1:4-diamino benzene-5-sulfonic acid → (J-acid)$_2$ | Beta naphthol | Bordeaux. |
| 31 | Di(meta-amino-benzoyl) 1:3-diamino benzene-4-sulfonic acid → ((meta-amino-benzoyl) J-acid)$_2$ | do | Orange. |
| 32 | Di(meta-amino-benzoyl) 1:3-diamino benzene-4-sulfonic acid → ((para-amino-benzoyl) J-acid)$_2$ | do | Do. |
| 33 | Di(meta-amino-benzoyl) 1:3-diamino benzene-4-sulfonic acid → (1-meta-amino-phenyl-5-pyrazolone-3-carboxylic acid)$_2$ | Beta naphthol | Orange. |
| | | 1-phenyl-3-methyl-5-pyrazolone | Yellow. |
| | | 2:4-dihydroxy quinoline | Do. |
| | | Aceto acetanilide | Do. |
| | | Meta phenylene diamine | Red brown. |
| 34 | Di(meta-amino-benzoyl) 1:3-diamino benzene-4-sulfonic acid → (1-meta-amino-phenyl-3-methyl-5-pyrazolone)$_2$ | Beta naphthol | Orange. |
| | | Meta tolylene diamine | Red brown. |
| | | 1-phenyl-3-methyl-5-pyrazolone | Yellow. |
| | | 2:4-dihydroxy quinoline | Do. |
| | | Aceto acetanilide | Do. |
| 35 | Di(para-amino-benzoyl) 1:3-diamino benzene-4-sulfonic acid → (1-meta-amino-phenyl-5-pyrazolone-3-carboxylic acid)$_2$ | Beta naphthol | Orange. |
| | | 1-phenyl-3-methyl-5-pyrazolone | Yellow. |
| 36 | Di(para-amino-benzoyl) 1:3-diamino benzene → (1-meta-amino-phenyl-5-pyrazolone-3-carboxylic acid)$_2$ | Beta naphthol | Orange. |
| | | 1-phenyl-3-methyl-5-pyrazolone | Yellow. |

F. The products of the invention may be produced on the fiber or in isolated form. Coupling components comprise benzene, naphthalene, pyrazolones, quinoline or aceto acetanilide nuclei in which coupling takes place adjacent to an hydroxy or amino group. The azo components are represented by the formula:

$R_2N{=}N{-}R_1{-}COHN{-}R{-}NHOC{-}R_1{-}N{=}N{-}R_2$ in which R comprises a benzene nucleus, $R_1$ comprise aryl nuclei, and $R_2$ comprise benzene, naphthalene or pyrazolone nuclei.

G. There may be substituted on the various nuclei of the invention substituent groups from the list alkyl, alkoxy, halogen, aryloxy, aralkyl, aralkoxy, aryl, hydroaryloxy, trifluoro-alky, hydroxy, sulfonic acid and carboxyl.

H. The preferred products, when applied by diazotization and development on the fiber, produce dyeings of outstanding fastness to washing and of exceptional discharge properties.

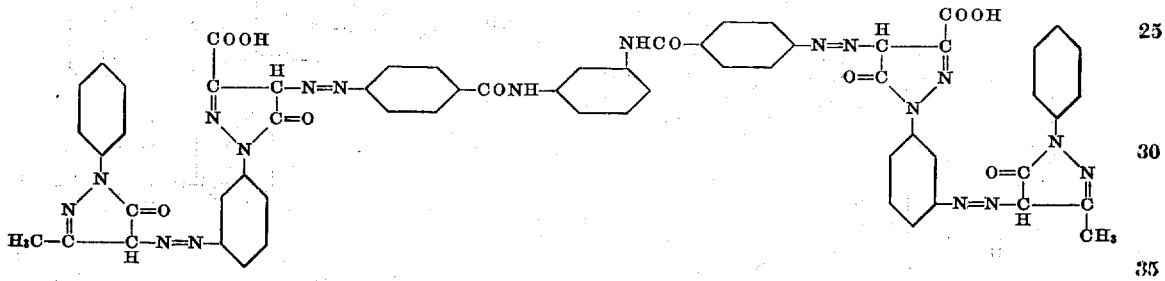

The dyes are frequently used in the form of their alkali metal salts.

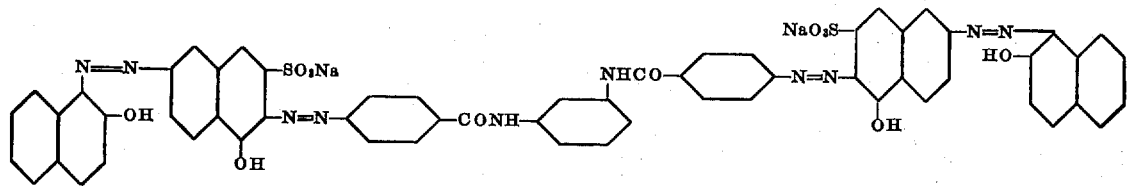

I. As many apparently widely different embodiments of this invention may be made without departing from the spirit and scope thereof, it is to be understood that I do not limit myself to the specific embodiments thereof except as defined in the appended claims.

I claim:

1. The compound represented by the formula:

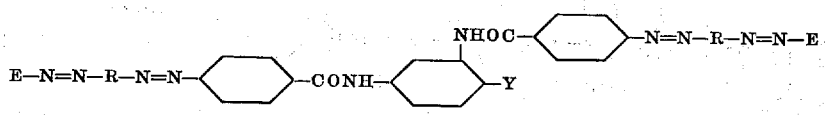

in which each R is a radical of a primary arylamine of the group consisting of an amino naphthol sulfonic acid, 1-meta-amino-phenyl-5-pyrazolone-3-methyl, and 1-meta-amino-phenyl-5-pyrazolone-3-carboxyl, each E is the radical of an azo dyestuff coupling component of the class consisting of those having benzene, naphthalene, pyrazolone, quinoline, and aceto-acetanilide nuclei, and Y is one of a group consisting of hydrogen and sulfonic acid.

2. The compound represented by the formula:

3. The compound represented by the formula:

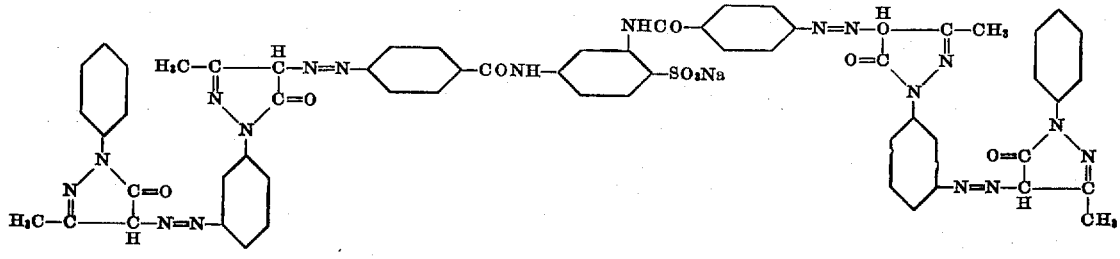

4. The compound represented by the formula:

5. A material of organic fibrous origin dyed with the product represented by the formula:

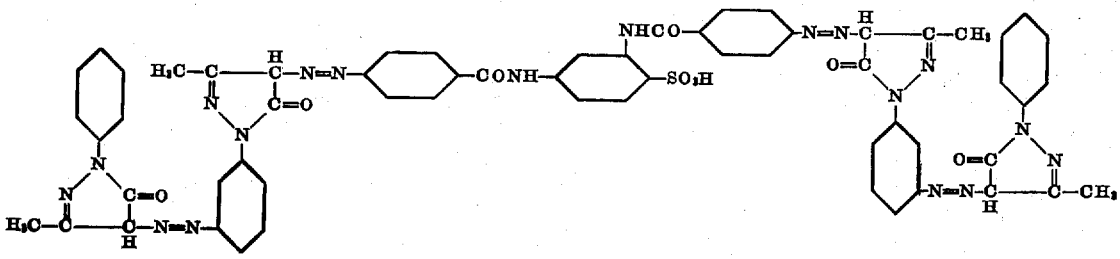

6. A material of organic fibrous origin dyed with the product represented by the formula:

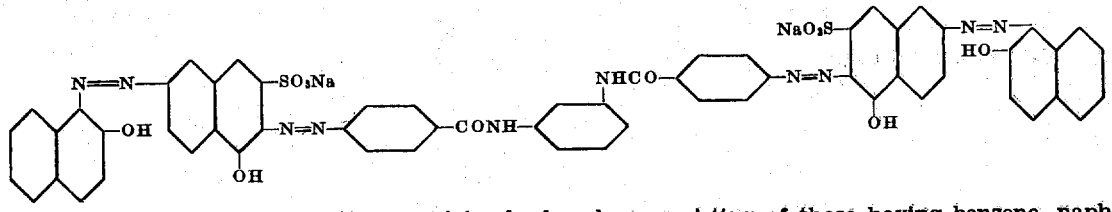

7. A material of organic fibrous origin dyed with the product represented by the formula:

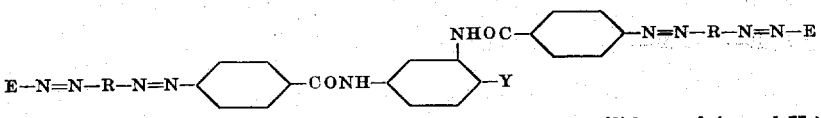

in which each R is a radical of a primary arylamine of the group consisting of an amino naphthol sulfonic acid, 1-meta-amino-phenyl-5-pyrazolone-3-methyl, and 1-meta-amino-phenyl-5-pyrazolone-3-carboxyl, each E is the radical of an azo dyestuff coupling component, from the class consisting of those having benzene, naphthalene, pyrazolone, quinoline, and acetoacetanilide nuclei, and Y is one of a group consisting of hydrogen and sulfonic acid.

8. A material of organic fibrous origin dyed with the product represented by the formula:

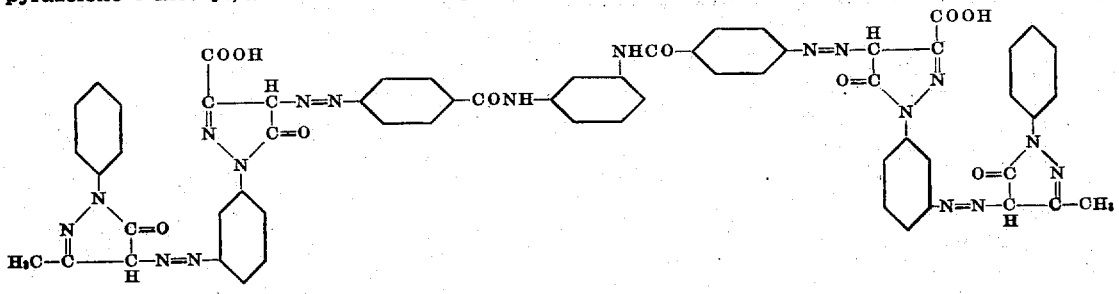

SWANIE S. ROSSANDER.